United States Patent
Song et al.

(10) Patent No.: US 8,908,257 B2
(45) Date of Patent: Dec. 9, 2014

(54) ELECTROPHORETIC DISPLAY DEVICE AND MANUFACTURING METHOD THEREOF

(75) Inventors: SangMoo Song, Gumi-si (KR); DaeSung Jung, Gumi-si (KR); YoungJoon Shin, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/243,589

(22) Filed: Sep. 23, 2011

(65) Prior Publication Data

US 2012/0140315 A1    Jun. 7, 2012

(30) Foreign Application Priority Data

Dec. 6, 2010 (KR) .......................... 10-2010-0123727

(51) Int. Cl.
| G02B 26/00 | (2006.01) |
| G02B 26/08 | (2006.01) |
| G02F 1/29  | (2006.01) |
| G02F 1/03  | (2006.01) |
| G02F 1/07  | (2006.01) |

(52) U.S. Cl.
USPC ........................... 359/296; 359/298; 359/254

(58) Field of Classification Search
USPC ......... 359/290–292, 295, 296, 298, 237, 242, 359/245, 247, 252, 254, 265, 267, 273; 438/25–27, 29–30, 55, 64
See application file for complete search history.

(56) References Cited

U.S. PATENT DOCUMENTS

| 8,012,288 | B2* | 9/2011 | Kim et al. ...................... 156/235 |
| 2007/0040798 | A1 | 2/2007 | Kawai |
| 2008/0145589 | A1* | 6/2008 | Hung et al. ..................... 428/68 |
| 2010/0073279 | A1* | 3/2010 | Kwon et al. .................. 345/107 |

FOREIGN PATENT DOCUMENTS

| CN | 1920653 A | 2/2007 | |
| JP | 2009093108 | * 10/2007 | .............. G02F 1/167 |
| JP | 2009-093108 | * 12/2007 | .............. G02F 1/167 |
| JP | 2009-093108 | 4/2009 | |

OTHER PUBLICATIONS

Office Action issued in corresponding Chinese Patent Application No. 201110370087.8, mailed Jan. 16, 2014, 12 pages.

* cited by examiner

*Primary Examiner* — Thomas K Pham
*Assistant Examiner* — Brandi Thomas
(74) *Attorney, Agent, or Firm* — Brinks Gilson & Lione

(57) ABSTRACT

Disclosed is an electrophoretic display device and manufacturing method thereof, which prevent water from penetrating into an electrophoretic film. The electrophoretic display device comprises an electrophoretic display panel comprising a substrate with a thin film transistor formed thereon, and an electrophoretic film coupled to the substrate; a protective sheet coupled to the electrophoretic film; a circuit film coupled to the substrate to be disposed at an outer side of the electrophoretic film; a first sealant formed on the substrate, for sealing a gap between the electrophoretic film and the protective sheet and a gap between the electrophoretic film and the substrate; and a second sealant sealing a gap between the substrate and the circuit film.

13 Claims, 5 Drawing Sheets

ELECTROPHORETIC DISPLAY DEVICE AND MANUFACTURING METHOD THEREOF

CROSS REFERENCE TO RELATED APPLICATIONS

This application claims the benefit of the Korean Patent Application No. 10-2010-0123727 filed on Dec. 6, 2010, which is hereby incorporated by reference as if fully set forth herein.

BACKGROUND

1. Field of the Disclosure

The present disclosure relates to an electrophoretic display device which displays an image with electrophoresis, and a manufacturing method thereof.

2. Discussion of the Related Art

Electrophoretic display (EPD) devices denote devices that display an image with electrophoresis in which colored charged particles move by an electric field given from the outside. Herein, electrophoresis denotes an electrophoretic motion when an electric field is applied to electrophoretic dispersion liquid that is formed by dispersing charged particles into liquid, the charged particles moves in the liquid by Coulomb force.

Such EPD devices have bistability, and thus can maintain the original image for a long time even when an applied voltage is removed. That is, since EPD devices maintain a constant screen for a long time even when a voltage is not continuously applied thereto, the EPD devices are suitable for an e-book field that does not require the quick change of a screen. Also, EPD devices are not dependent on a viewing angle unlike Liquid Crystal Displays (LCDs), and moreover, provide an image comfortable for eyes by the degree similar to papers.

An EPD device includes an electrophoretic film, a substrate, and a Protective Sheet (PS). The electrophoretic film is formed between the substrate and the protective sheet. A Thin Film Transistor (TFT) is formed at one surface of the substrate facing the electrophoretic film. The protective sheet is formed on the reverse of the substrate with respect to the electrophoretic film. That is, the electrophoretic film is formed on the substrate, and the protective film is formed on the electrophoretic film.

Herein, since the electrophoretic film is vulnerable to water in characteristic, the EPD device is deteriorated in performance when the electrophoretic film is stained with water, and thus, reliability for the quality of the EPD device is degraded. To prevent such limitations, technology for preventing water from penetrating into the electrophoretic film is required to be developed in EPD devices.

SUMMARY

An electrophoretic display (EPD) device includes: an electrophoretic display panel including a substrate with a thin film transistor formed thereon, and an electrophoretic film coupled to the substrate; a protective sheet coupled to the electrophoretic film; a circuit film coupled to the substrate to be disposed at an outer side of the electrophoretic film; a first sealant formed on the substrate, for sealing a gap between the electrophoretic film and the protective sheet and a gap between the electrophoretic film and the substrate; and a second sealant sealing a gap between the substrate and the circuit film.

In another aspect of the present invention, there is provided a method of manufacturing an EPD device, including: coupling an electrophoretic film to a substrate; coupling a protective sheet to the electrophoretic film, and coupling a support member to another surface of the substrate on the reverse of one surface of the substrate coupled to the electrophoretic film; coupling a circuit film to the substrate to be disposed at an outer side of the electrophoretic film; forming a first sealant on the substrate, for sealing a gap between the electrophoretic film and the protective sheet and a gap between the electrophoretic film and the substrate; and forming a second sealant between the circuit film and the support member, for sealing a gap between the substrate and the circuit film.

In another aspect of the present invention, there is provided a method of manufacturing an EPD device, including: coupling an electrophoretic film to a substrate; coupling a circuit film to the substrate to be disposed at an outer side of the electrophoretic film; coupling a protective sheet to the electrophoretic film; forming a first sealant for sealing a gap between the electrophoretic film and the protective sheet and a gap between the electrophoretic film and the substrate; and forming a second sealant for sealing a gap between the substrate and the circuit film.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EXEMPLARY EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Hereinafter, an EPD device according to embodiments of the present invention will be described with reference to the accompanying drawings.

Figure 1:
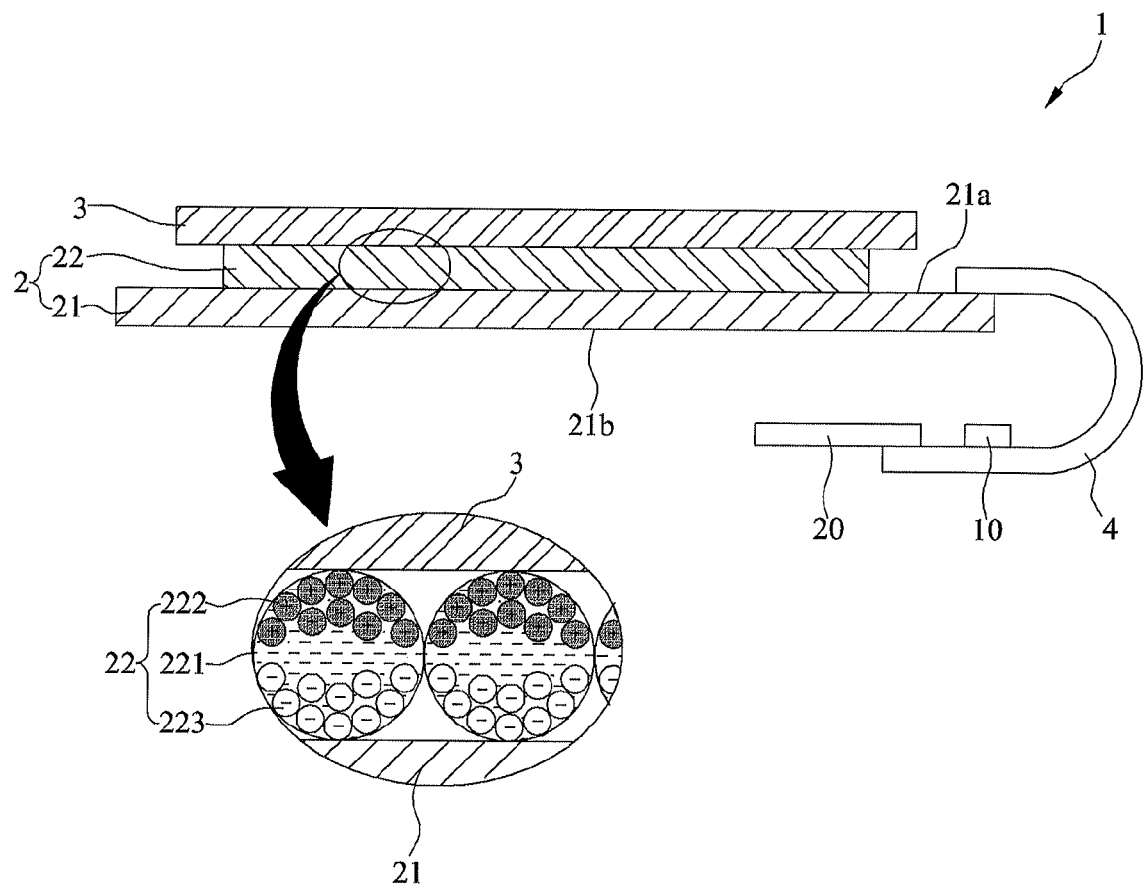
FIG. 1 is a sectional view schematically illustrating an EPD device according to an embodiment of the present invention.
Figure 2:
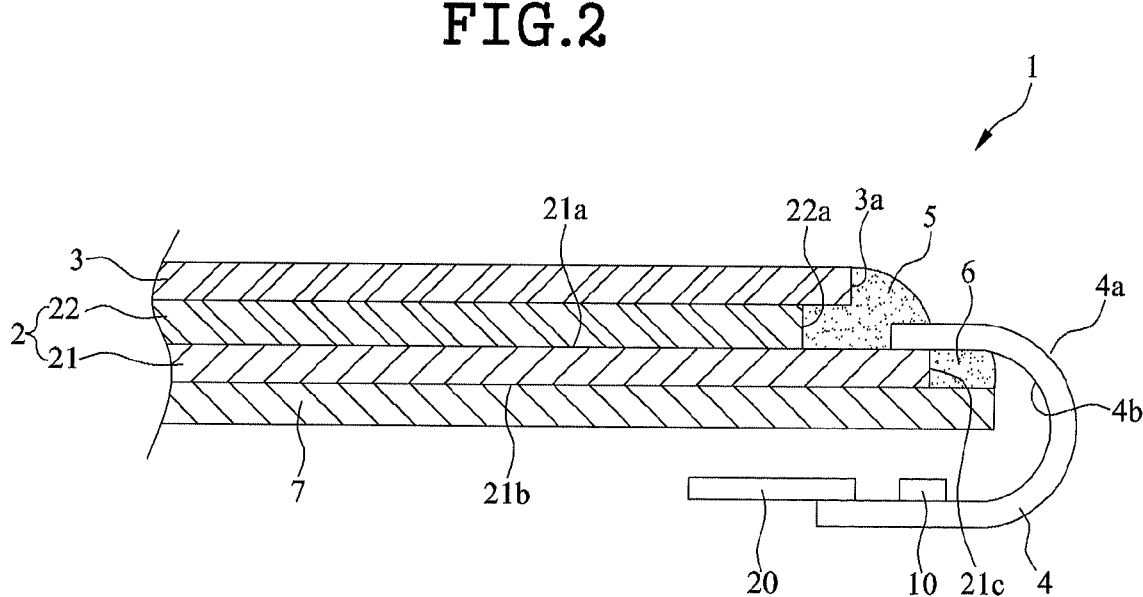
FIGS. 2 and 3 are sectional views schematically illustrating first and second sealants in an EPD device according to an embodiment of the present invention.
Figure 3:
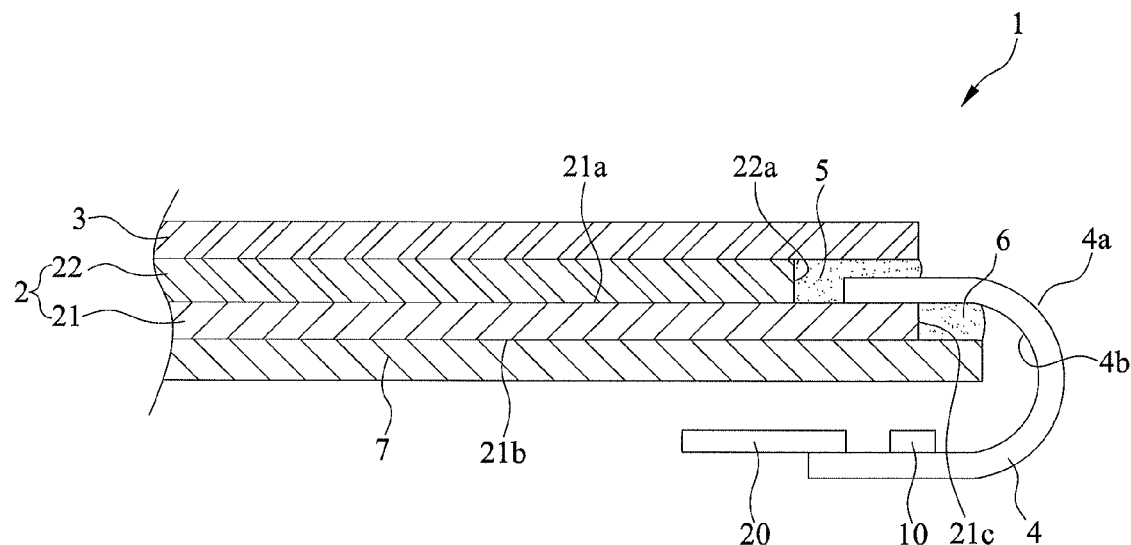
Figure 4:
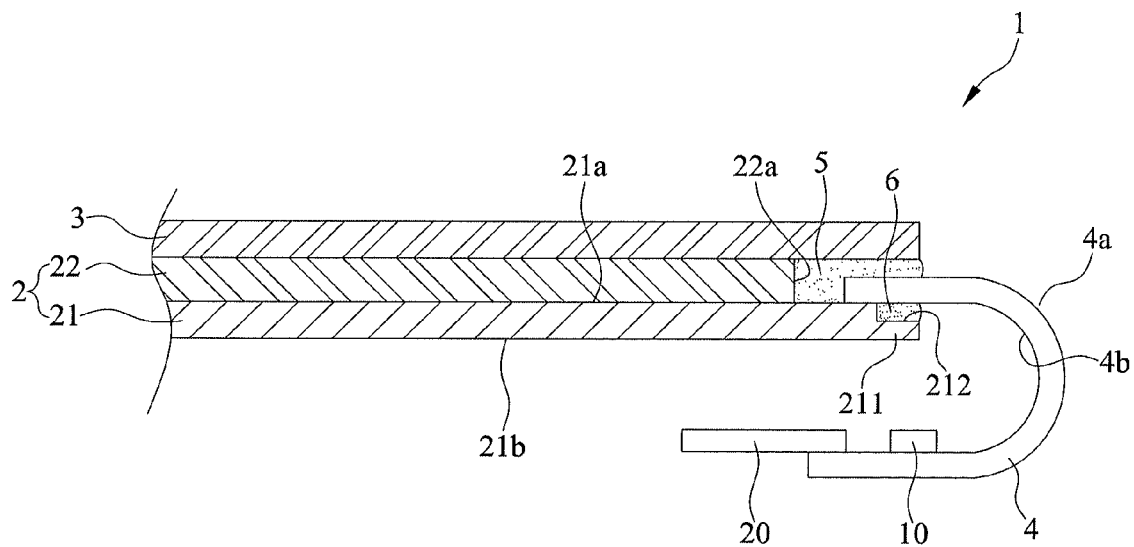
FIG. 4 is a sectional view schematically illustrating an EPD device according to a modified embodiment of the present invention.

FIG. 1 is a sectional view schematically illustrating an EPD device according to an embodiment of the present invention. FIGS. 2 and 3 are sectional views schematically illustrating first and second sealants in an EPD device according to an embodiment of the present invention. FIG. 4 is a sectional view schematically illustrating an EPD device according to a modified embodiment of the present invention.

Referring to FIGS. 1 and 2, an EPD device 1 according to an embodiment of the present invention includes an electrophoretic display panel 2, a protective sheet 3, a circuit film 4, a first sealant 5, and a second sealant 6.

The electrophoretic display panel 2 is for displaying an image with electrophoresis. The electrophoretic display panel 2 includes a substrate 21 and an electrophoretic film 22.

A Thin Film transistor (TFT, not shown) is formed on the substrate 21. As illustrated in FIG. 1, the TFT may be formed on a top surface 21a of the substrate 21. The substrate 21 may be a metal substrate, a plastic substrate, or a glass substrate. For example, the substrate 21 may be formed of a stainless steel. The substrate 21 may be entirely formed in a tetragonal plate shape.

Referring to FIGS. 1 and 2, the electrophoretic film 22 is coupled onto the substrate 21. As illustrated in FIG. 1, the electrophoretic film 22 may be adhered and coupled to the top surface 21a of the substrate 21. The electrophoretic film 22 includes a microcapsule 221. The microcapsule 221 has electrophoretic dispersion liquid therein. The electrophoretic dispersion liquid includes a dielectric solvent, and positive charged particles 222 and negative charged particles 223 that are dispersed in the dielectric solvent. The dielectric solvent may be transparent for securing reflected luminance. FIG. 1 illustrates the electrophoretic dispersion liquid where the positive charged black particles 222 and the negative charged white particles 223 are dispersed in a colorless dielectric solvent, but the electrophoretic dispersion liquid according to an embodiment of the present invention is not limited thereto. The present invention may use an electrophoretic dispersion liquid where charged white particles are dispersed in a dielectric solvent including a black dye. The electrophoretic film 22 may be a Front-Plane Laminate (FPL). Although not shown, the EPD device 1 may be use the electrophoretic film 22 having a microcup type.

Although not shown, the electrophoretic film 22 may include a base film, a common electrode, and an adhesive layer. The electrophoretic film 22 may be formed in a structure where the adhesive layer, the microcapsules 221, the common electrode and the base film are sequentially stacked. The microcapsules 221 are disposed between the adhesive layer and the common electrode. The base film may be formed on the common electrode. The base film may be formed of a glass or plastic. The common electrode may be formed of indium tin oxide (ITO) or indium zinc oxide (IZO). The base film and the common electrode may be formed transparently for displaying an image. The adhesive layer may be adhered to the substrate 21.

Referring to FIGS. 1 and 2, the protective sheet 3 is coupled onto the electrophoretic film 22. As illustrated in FIG. 1, the protective sheet 3 may be adhered and coupled to a top surface of the electrophoretic film 22. The protective sheet 3 may be entirely formed in a tetragonal plate shape.

Referring to FIGS. 1 and 2, the circuit film 4 is disposed at an outer side of the electrophoretic film 22 and coupled onto the substrate 21. As illustrated in FIG. 1, the circuit film 4 may be adhered and coupled to the top surface 21a of the substrate 21, at the outer side of the electrophoretic film 22. The circuit film 4 may be coupled to the substrate 21 with an Anisotropic Conductive Film (AFC, not shown). A driving IC 10 and a Flexible Printed Circuit (FPC) 20 are coupled to the circuit film 4. A plurality of gate lines and data lines formed on the substrate 21 may be electrically connected to the driving IC 10 through the circuit film 4, in a Chip On Film (COF) type.

Referring to FIG. 2, the first sealant 5 seals a gap between the electrophoretic film 22 and the protective sheet 3, and a gap between the electrophoretic film 22 and the substrate 21. Accordingly, the first sealant 5 can protect the electrophoretic film 22 from water. The first sealant 5 is formed on the substrate 21. As illustrated in FIG. 2, the first sealant 5 may be formed at the top surface 21a of the substrate 21. The first sealant 5 may be formed in a tetragonal ring shape so as to surround the entire outer side of the electrophoretic film 22. The first sealant 5 may be formed by discharging a fluid sealant onto the substrate 21 and then hardening the fluid sealant. The first sealant 5 may be formed in order for a portion thereof to be disposed at one surface 4a of the circuit film 4. The one surface 4a of the circuit film 4 is a surface opposite to another surface 4b of the circuit film 4 adhered to the substrate 21. As illustrated in FIG. 2, the first sealant 5 may be formed to contact a side 22a of the electrophoretic film 22, a side 3a of the protective sheet 3, a portion of the top surface 21a of the substrate 21 disposed at the outer side of the electrophoretic film 22, and a portion of the one surface 4a of the protective film 4.

Referring to FIG. 2, the second sealant 6 seals a gap between the substrate 21 and the circuit film 4. Accordingly, the second sealant 6 can protect the electrophoretic film 22 from water. The EPD device 1 doubly prevents water from penetrating into the electrophoretic film 22 by using the first and second sealants 5 and 6, thus preventing performance from being degraded by water with which the electrophoretic film 22 is stained. Accordingly, the EPD device 1 can enhance reliability for quality thereof. The second sealant 6 may be formed at the other surface 4b of the circuit film 4 to be disposed at a side 21c of the substrate 21. Therefore, the second sealant 6 can prevent water from penetrating between the other surface 4b of the circuit film 4 and the top surface 21a of the substrate 21. The second sealant 6 may be formed to contact the side 21c of the substrate 21, and a portion of the other surface 4b of the circuit film 4. The second sealant 6 may be formed in a tetragonal ring shape so as to surround the entire side 21c of the substrate 21.

Referring to FIG. 2, an EPD device 1 according to an embodiment of the present invention may include a support member 7 for supporting the second sealant 6. The support member 7 is coupled to the substrate 21 that is disposed on the reverse of the electrophoretic film 22 with respect to the substrate 21. As illustrated in FIG. 2, the support member 7 may be adhered and coupled to a bottom surface 21b of the substrate 21. The support member 7 may be formed of polyethylene terephthalate (PET). The second sealant 6 may be formed on the support member 7. As illustrated in FIG. 2, the second sealant 6 may be formed at a top surface of the support member 7. The support member 7 may be formed in a size larger than that of the substrate 21 to protrude outward from the substrate 21. The second sealant 6 may be formed at a portion of the support member 7 protruding from the substrate. Accordingly, the second sealant 6 may be supported by the support member 7, and thus can be securely maintained in a state capable of sealing a gap between the substrate 21 and the circuit film 4. The support member 7 may be entirely formed in a tetragonal plate shape. Although not shown, the support member 7 may be formed in a tetragonal ring shape so as to include a portion thereof protruding from the substrate 21 and a portion thereof coupled to a portion of the substrate 21. The second sealant 6 may be formed by discharging a fluid sealant to a gap between the support member 7 and the circuit film 4 and then hardening the fluid sealant.

Referring to FIG. 3, a protective sheet 3 included in an EPD device 1 according to an embodiment of the present invention may be formed to have a further extended size compared to that of FIG. 2. That is, the EPD device 1 may be formed to have an extended PS structure. The protective sheet 3 may be formed to have a size that is extended from the substrate 21 to a portion thereof coupled to the circuit film 4. The protective sheet 3 may be formed to have a size that is approximately matched with the substrate 21. Although not shown, the protective sheet 3 may be formed to have a size larger than that of the substrate 21. An electrophoretic film 22 may also be formed to have a further extended size compared to that of FIG. 2.

In this way, when the protective sheet 3 is formed to have an extended size, the first sealant 5 may be formed between the protective sheet 3 and the circuit film 4. As illustrated in FIG. 3, the first sealant 5 may be formed to contact a side 22a of the electrophoretic film 22, a portion of the protective sheet 3 disposed at an outer side of the electrophoretic film 22, a portion of the top surface 21a of the substrate 21 disposed at the outer side of the electrophoretic film 22, and a portion of one surface 4a of the circuit film 4. The first sealant 5 may be formed by discharging a fluid sealant to a gap between the protective sheet 3 and the circuit film 4 and then hardening the fluid sealant.

Referring to FIG. 4, an EPD device 1 according to a modified embodiment of the present invention includes the substrate 21, which may include a protrusion member 211. The protrusion member 211 may be formed to protrude outward from a portion of the substrate 21 coupled to the circuit film 4. The protrusion member 211 may support the second sealant 6 instead of the support member 7. Accordingly, the second sealant 6 may be supported by the protrusion member 211, and thus can be securely maintained in a state capable of sealing a gap between the substrate 21 and the circuit film 4. The second sealant 6 may be formed between the protrusion member 211 and the circuit film 4. As illustrated in FIG. 4, the second sealant 6 may be formed to contact the protrusion member 211 and a portion of the other surface 4b of the circuit film 4. The protrusion member 211 may be entirely formed in a tetragonal ring shape, and the second sealant 6 may be formed in a tetragonal ring shape to correspond to the protrusion member 211.

As illustrated in FIG. 4, a groove 212 for disposing the second sealant 6 therein may be formed at the protrusion member 211. A portion of the substrate 21 with the protrusion member 211 formed therein may be formed thinner than another portion of the substrate 21, by the groove 212. Accordingly, a broad space for forming the second sealant 6 between the protrusion member 211 and the circuit film 4 may be secured. Therefore, the EPD device 1 can enhance workability in forming the second sealant 6 between the protrusion member 211 and the circuit film 4. Although not shown, the groove 212 may be formed to be inclined in a direction progressively closer to the bottom surface 21b of the substrate 21 with respect to a horizontal plane formed by the top surface 21a of the substrate 21. In FIG. 4, the protrusion member 211 and the groove 212 are illustrated as being applied to the EPD device 1 having the extended PS structure, but the present invention is not limited thereto. As illustrated in FIG. 2, the protrusion member 211 and the groove 212 may also be applied to an EPD device 1 having a normal structure.

Hereinafter, a method of manufacturing an EPD device, according to an embodiment of the present invention, will be described with reference to the accompanying drawings. The method of manufacturing an EPD device, according to an embodiment of the present invention, is for manufacturing the above-described EPD device, and may be largely realized according to an embodiment, another embodiment, and still other embodiment. Hereinafter, the embodiments of the present invention will be sequentially described with reference to the relevant accompanying drawings, respectively.

Figure 5:
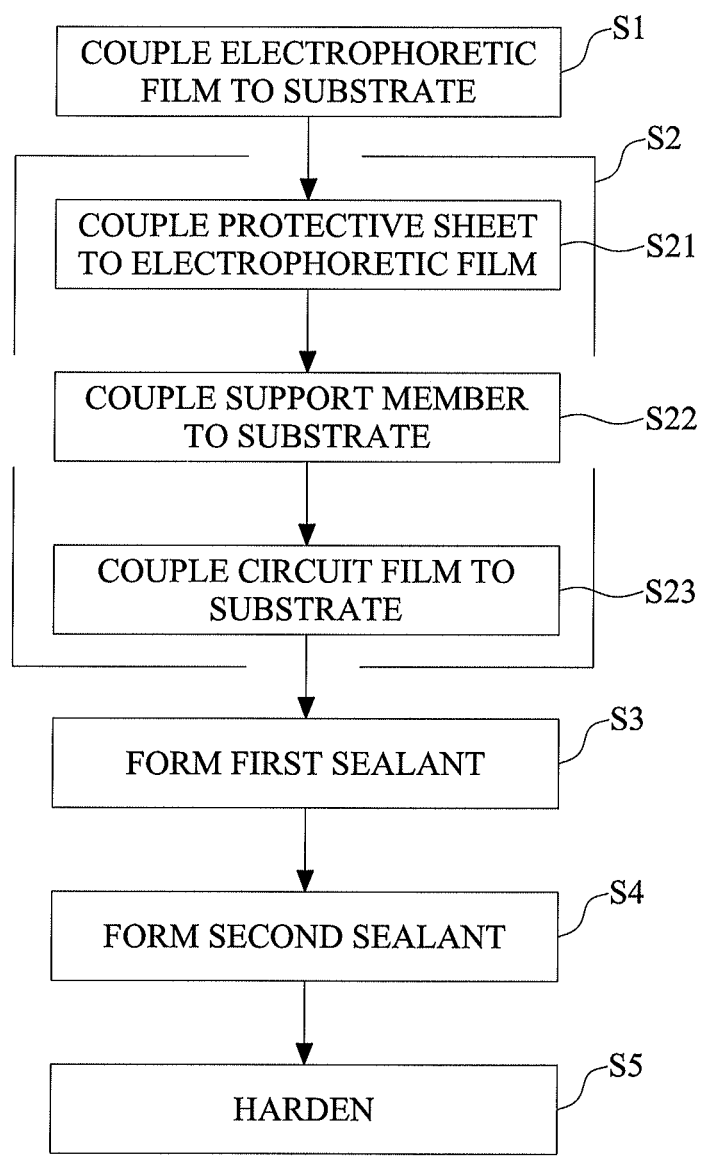
FIG. 5 is a flowchart illustrating a method of manufacturing an EPD device, according to an embodiment of the present invention.
Figure 6:
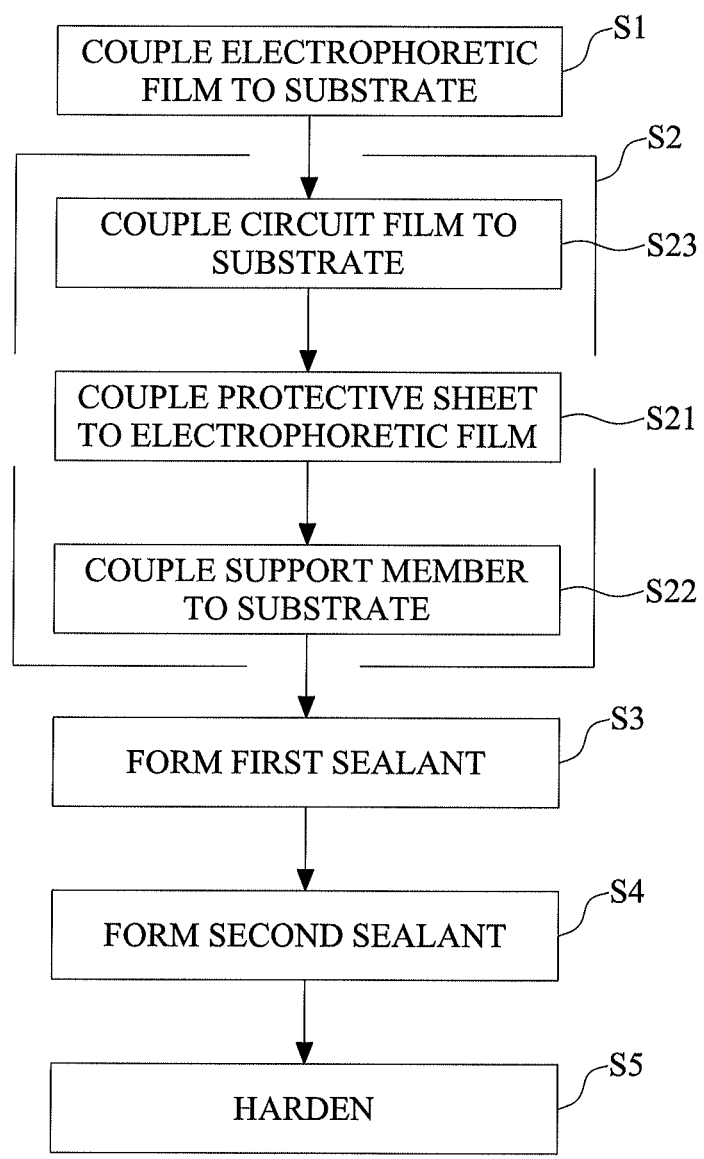
FIG. 6 is a flowchart illustrating a method of manufacturing an EPD device, according to another embodiment of the present invention.
Figure 7:
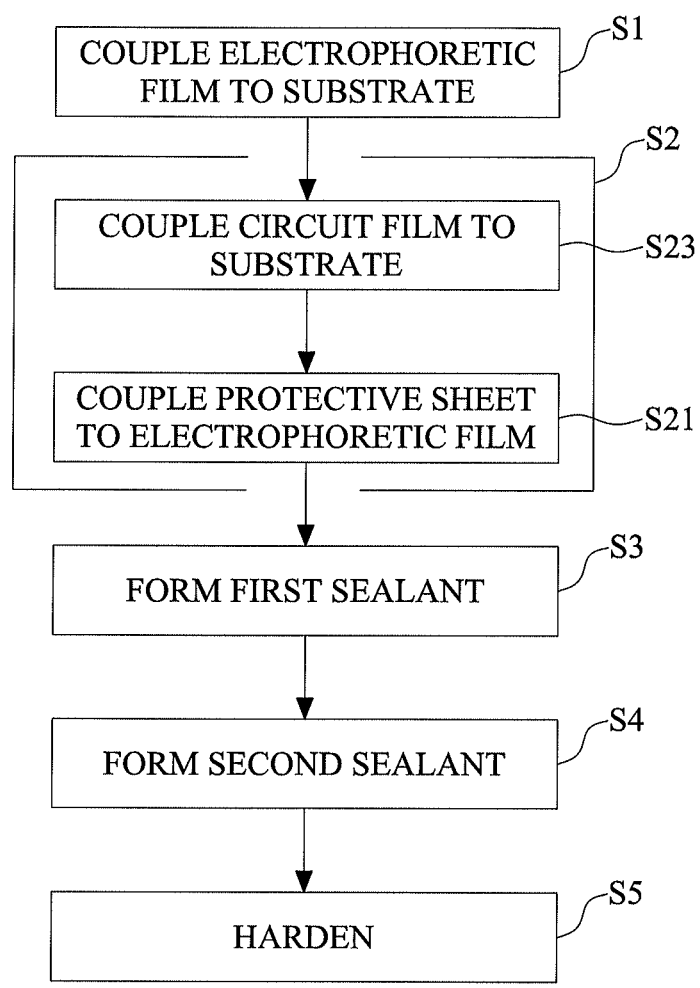
FIG. 7 is a flowchart illustrating a method of manufacturing an EPD device, according to still other embodiment of the present invention.

FIG. 5 is a flowchart illustrating a method of manufacturing an EPD device, according to an embodiment of the present invention. FIG. 6 is a flowchart illustrating a method of manufacturing an EPD device, according to another embodiment of the present invention. FIG. 7 is a flowchart illustrating a method of manufacturing an EPD device, according to still other embodiment of the present invention.

Referring to FIGS. 2 and 5, a method of manufacturing an EPD device, according to an embodiment of the present invention, has the below-described configuration.

First, the electrophoretic film 22 is coupled to the substrate 21 in operation S1. Operation S1 may be performed by laminating the electrophoretic film 22 on the top surface 21a of the substrate 21 with a TFT formed therein. By adhering the adhesive layer (not shown) of the electrophoretic film 22 to the substrate 21, the electrophoretic film 22 may be coupled to the substrate 21. The substrate 21 may be a metal substrate, a plastic substrate, or a glass substrate. For example, the substrate 21 may be formed of a stainless steel. The electrophoretic film 22 may be FPL.

Subsequently, the protective sheet 3, support member 7, and circuit film 4 are coupled respectively in operation S2. Operation S2 includes operation S21 of coupling the protective sheet 3 to the electrophoretic film 22, operation S22 of coupling the support member 7 to the substrate 21, and operation S23 of coupling the circuit film 4 to the substrate 21. Operation S21 of coupling the protective sheet 3 to the electrophoretic film 22, operation S22 of coupling the support member 7 to the substrate 21, and operation S23 of coupling the circuit film 4 to the substrate 21 may be performed sequentially. The method of manufacturing the EPD device, according to an embodiment of the present invention, is suitable for manufacturing the EPD device 1 having the normal structure that is as illustrated in FIG. 2. Operations S21 to S23 will be described in detail below.

First, the electrophoretic film 22 is coupled to the substrate 21 in operation S1, and then the protective sheet 3 is coupled to the electrophoretic film 22 in operation S21. Operation S21 may be performed by coupling the protective sheet 3 onto the electrophoretic film 22. By operation S21, the electrophoretic film 22 is disposed between the substrate 21 and the protective sheet 3.

Subsequently, the electrophoretic film 22 is coupled to the protective sheet 3 in operation S21, and then the support member 7 is coupled to the substrate 21 in operation S22. Operation S22 may be performed by coupling the support member 7 to the other surface 21b of the substrate 21 on the reverse of the one surface 21a of the substrate 21 coupled to the electrophoretic film 22. The support member 7, which is formed to have a size larger than that of the substrate 21, may be coupled to the substrate 21. The support member 7 may be coupled to the substrate 21 to protrude outward from the substrate 21, by operation S22.

Subsequently, the support member 7 is coupled to the substrate 21 in operation S22, and then the circuit film 4 is coupled to the substrate 21 in operation S23. Operation S23 may be performed by coupling the circuit film 4 onto the substrate 21 to be disposed at the outer side of the electrophoretic film 22. As illustrated in FIG. 2, the protective sheet 3 does not obstruct the EPD device 1 having the normal structure in coupling the circuit film 4 to the substrate 21 even after the protective sheet 3 has been coupled to the electrophoretic film 22. The circuit film 4 may be coupled to the substrate 21 with an anisotropic conductive film (not shown). The circuit film 4 may be in a state where the driving IC 10 and the flexible printed circuit 20 have been coupled to the circuit film 4. The circuit film 4 may be coupled to the substrate 21 such that a plurality of gate lines and data lines formed on the substrate 21 are electrically connected to the driving IC 10 in a Chip On Film (COF) type.

Although not shown, in the method of manufacturing the EPD device according to an embodiment of the present invention, if operation S21 of coupling the protective sheet 3 to the electrophoretic film 22 is performed and then operation S23 of coupling the circuit film 4 to the substrate 21 is performed in order, operation S23 of coupling the support member 7 to the substrate 21 may be performed before operation S21 of coupling the protective sheet 3 to the electrophoretic film 22 is performed or after operation S23 of coupling the circuit film 4 to the substrate 21 has been performed.

Subsequently, the first sealant 5 is formed in operation S3. Operation S3 may be performed by forming the first sealant 5 onto the substrate 21. Accordingly, the first sealant 5 may seal a gap between the electrophoretic film 22 and the protective sheet 3, and a gap between the electrophoretic film 22 and the substrate 21. Therefore, the first sealant 5 can protect the electrophoretic film 22 from water. In operation S3, the first sealant 5 may be formed at the top surface 21a of the substrate 21. The first sealant 5 may be formed in a tetragonal ring shape to surround the entire outer side of the electrophoretic film 22. Operation S3 may be performed by discharging a fluid sealant onto the substrate 21. By operation S3, as illustrated in FIG. 2, the first sealant 5 may be formed to contact the side 22a of the electrophoretic film 22, the side 3a of the protective sheet 3, a portion of the top surface 21a of the substrate 21 disposed at the outer side of the electrophoretic film 22, and a portion of the one surface 4a of the circuit film 4.

Subsequently, the second sealant 6 is formed in operation S4. Operation S4 may be performed by forming the second sealant 6 between the circuit film 4 and the support member 7. Therefore, the second sealant 6 may seal a gap between the substrate 21 and the circuit film 4. Accordingly, the second sealant 6 can protect the electrophoretic film 22 from water. According to the method of manufacturing the EPD device, provided can be the EPD device 1 that can doubly prevent water from penetrating into the electrophoretic film 22 by using the first and second sealants 5 and 6. According to the method of manufacturing the EPD device, accordingly, the EPD device 1 can prevent performance from being deteriorated by water with which the electrophoretic film 22 is stained, and thus the EPD device 1 with enhanced reliability for quality can be manufactured.

The second sealant 6 may be formed on the support member 7, by operation S4. As illustrated in FIG. 2, the second sealant 6 may be formed at the top surface of the support member 7. The second sealant 6 may be formed at a portion of the support member 7 protruding from the substrate 21. Accordingly, the second sealant 6 may be supported by the support member 7, and thus can be securely maintained in a state capable of sealing a gap between the substrate 21 and the circuit film 4. Operation S4 may be performed by discharging a fluid sealant onto the support member 7. By operation S4, as illustrated in FIG. 2, the second sealant 6 may be formed to contact the side 21c of the substrate 21, a portion of the support member 7 protruding from the substrate 21, and a portion of the other surface 4b of the circuit film 4. The second sealant 6 may be formed in a tetragonal ring shape to surround the entire side 21c of the substrate 21.

Although not shown, in the method of manufacturing the EPD device according to an embodiment of the present invention, operation S3 of forming the first sealant 5 and operation S4 of forming the second sealant 6 may be performed simultaneously, or one of operations S3 and S4 may be performed first.

Subsequently, the first and second sealants 5 and 6 are hardened in operation S5. Operation S5 may be performed by heat-hardening the first and second sealants 5 and 6. Although not shown, operation of hardening the first sealant 5 and operation of hardening the second sealant 6 may be performed simultaneously, or one of operations may be performed first.

Hereinafter, a method of manufacturing an EPD device, according to another embodiment of the present invention, will be described in detail with reference to FIGS. 3 and 6. Referring to FIGS. 3 and 6, the method of manufacturing the EPD device, according to another embodiment of the present invention, has the below-described configuration.

First, the electrophoretic film 22 is coupled to the substrate 21 in operation S1. Operation S1 may be performed by laminating the electrophoretic film 22 on the top surface 21a of the substrate 21 with a TFT formed therein. By adhering the adhesive layer (not shown) of the electrophoretic film 22 to the substrate 21, the electrophoretic film 22 may be coupled to the substrate 21. The substrate 21 may be a metal substrate, a plastic substrate, or a glass substrate. For example, the substrate 21 may be formed of a stainless steel. The electrophoretic film 22 may be FPL.

Subsequently, the protective sheet 3, support member 7, and circuit film 4 are coupled respectively in operation S2. Operation S2 may be performed by sequentially performing operation S23 of coupling the circuit film 4 to the substrate 21, operation S21 of coupling the protective sheet 3 to the electrophoretic film 22, and operation S22 of coupling the support member 7 to the substrate 21. The method of manufacturing the EPD device, according to another embodiment of the present invention, is suitable for manufacturing the EPD device 1 having the extended PS structure that is as illustrated in FIG. 3. Operations S23, S21 and S22 will be described in detail below.

First, the electrophoretic film 22 is coupled to the substrate 21 in operation S1, and then the circuit film 4 is coupled to the substrate 21 in operation S23. Operation S23 may be performed by coupling the circuit film 4 onto the substrate 21 to be disposed at the outer side of the electrophoretic film 22. As illustrated in FIG. 3, if operation S21 of coupling the protective sheet 3 to the electrophoretic film 22 is performed and then operation S23 of coupling the circuit film 4 to the substrate 21 is performed, since the protective sheet 3 obstructs the EPD device 1 having the extended PS structure in coupling the circuit film 4 to the substrate 21, it is difficult to couple the circuit film 4 to the substrate 21. Therefore, in the method of manufacturing the EPD device according to another embodiment of the present invention, operation S23 of coupling the circuit film 4 to the substrate 21 may be performed prior to operation S21 of coupling the protective sheet 3 to the electrophoretic film 22. In operation S23, the circuit film 4 may be coupled to the substrate 21 with an anisotropic conductive film (not shown). The circuit film 4 may be in a state where the driving IC 10 and the flexible printed circuit 20 have been coupled to the circuit film 4. The circuit film 4 may be coupled to the substrate 21 such that a plurality of gate lines and data lines formed on the substrate 21 are electrically connected to the driving IC 10 in a Chip On Film (COF) type.

Subsequently, the circuit film 4 is coupled to the substrate 21 in operation S23, and then the protective sheet 3 is coupled to the electrophoretic film 22 in operation S21. Operation S21 may be performed by coupling the protective sheet 3 onto the electrophoretic film 22. By operation S21, the electrophoretic film 22 is disposed between the substrate 21 and the protective sheet 3. In operation S21, the protective sheet 3 is formed to have a further extended size as in FIG. 3, compared to that of the EPD device 1 having the normal structure that is as illustrated in FIG. 2. That is, in the method of manufacturing the EPD device according to another embodiment of the present invention, the EPD device 1 having the extended PS structure can be manufactured. The protective sheet 3 may be formed to have a size that is extended from the substrate 21 to a portion thereof coupled to the circuit film 4. The protective sheet 3 may be formed to have a size that is approximately matched with the substrate 21. Although not shown, the protective sheet 3 may be formed to have a size larger than that of the substrate 21. The electrophoretic film 22 may also be formed to have a further extended size compared to that of the EPD device 1 having the normal structure.

Subsequently, the electrophoretic film 22 is coupled to the protective sheet 3 in operation S21, and then the support member 7 is coupled to the substrate 21 in operation S22. Operation S22 may be performed by coupling the support member 7 to the other surface 21b of the substrate 21 on the reverse of the one surface 21a of the substrate 21 coupled to the electrophoretic film 22. The support member 7, which is formed to have a size larger than that of the substrate 21, may be coupled to the substrate 21. The support member 7 may be coupled to the substrate 21 to protrude outward from the substrate 21, by operation S22.

Although not shown, in the method of manufacturing the EPD device according to another embodiment of the present invention, if operation S23 of coupling the circuit film 4 to the substrate 21 is performed and then operation S21 of coupling the protective sheet 3 to the electrophoretic film 22 is performed in order, operation S22 of coupling the support member 7 to the substrate 21 may be performed before operation S23 of coupling the circuit film 4 to the substrate 21 is performed, or before operation S21 of coupling the protective sheet 3 to the electrophoretic film 22 is performed.

Subsequently, the first sealant 5 is formed in operation S3. Operation S3 may be performed by forming the first sealant 5 between the substrate 21 and the protective sheet 3. Accordingly, the first sealant 5 may seal a gap between the electrophoretic film 22 and the protective sheet 3, and a gap between the electrophoretic film 22 and the substrate 21. Accordingly, the first sealant 5 can protect the electrophoretic film 22 from water. In operation S3, the first sealant 5 may be formed by discharging a fluid sealant to a gap between the protective sheet 3 and the circuit film 4. By operation S3, as illustrated in FIG. 3, the first sealant 5 may be formed to contact the side 22a of the electrophoretic film 22, a portion of the protective sheet 3 disposed at the outer side of the electrophoretic film 22, a portion of the top surface 21a of the substrate 21 disposed at the outer side of the electrophoretic film 22, and a portion of the one surface 4a of the circuit film 4.

Subsequently, the second sealant 6 is formed in operation S4. Operation S4 may be performed by forming the second sealant 6 between the circuit film 4 and the support member 7. Therefore, the second sealant 6 may seal a gap between the substrate 21 and the circuit film 4. Accordingly, the second sealant 6 can protect the electrophoretic film 22 from water. In the method of manufacturing the EPD device according to another embodiment of the present invention, provided can be the EPD device 1 that can doubly prevent water from penetrating into the electrophoretic film 22 by using the first and second sealants 5 and 6. According to the method of manufacturing the EPD device, accordingly, the EPD device 1 can prevent performance from being deteriorated by water with which the electrophoretic film 22 is stained, and thus the EPD device 1 with enhanced reliability for quality can be manufactured.

The second sealant 6 may be formed on the support member 7, by operation S4. As illustrated in FIG. 3, the second sealant 6 may be formed at the top of the support member 7. The second sealant 6 may be formed at a portion of the support member 7 protruding from the substrate 21. Accordingly, the second sealant 6 may be supported by the support member 7, and thus can be securely maintained in a state capable of sealing a gap between the substrate 21 and the circuit film 4. Operation S4 may be performed by discharging a fluid sealant onto the support member 7. By operation S4, as illustrated in FIG. 2, the second sealant 6 may be formed to contact the side 21c of the substrate 21, a portion of the support member 7 protruding from the substrate 21, and a portion of the other surface 4b of the circuit film 4. The second sealant 6 may be formed in a tetragonal ring shape to surround the entire side 21c of the substrate 21.

Although not shown, in the method of manufacturing the EPD device according to another embodiment of the present invention, operation S3 of forming the first sealant 5 and operation S4 of forming the second sealant 6 may be performed simultaneously, or one of operations S3 and S4 may be performed first.

Subsequently, the first and second sealants 5 and 6 are hardened in operation S5. Operation S5 may be performed by heat-hardening the first and second sealants 5 and 6. Although not shown, operation of hardening the first sealant 5 and operation of hardening the second sealant 6 may be performed simultaneously, or one of operations may be performed first.

Hereinafter, a method of manufacturing an EPD device, according to still other embodiment of the present invention, will be described in detail with reference to FIGS. 4 and 7. Referring to FIGS. 4 and 7, the method of manufacturing the EPD device, according to still other embodiment of the present invention, has the below-described configuration.

First, the electrophoretic film 22 is coupled to the substrate 21 in operation S1. Operation S1 may be performed by laminating the electrophoretic film 22 on the top surface 21a of the substrate 21 with a TFT formed therein. By adhering the adhesive layer (not shown) of the electrophoretic film 22 to the substrate 21, the electrophoretic film 22 may be coupled to the substrate 21. The substrate 21 may be a metal substrate, a plastic substrate, or a glass substrate. For example, the substrate 21 may be formed of a stainless steel. The electrophoretic film 22 may be FPL.

Subsequently, the protective sheet 3 and circuit film 4 are coupled respectively in operation S2. Operations S2 includes operation S23 of coupling the circuit film 4 to the substrate 21 and operation S21 of coupling the protective sheet 3 to the electrophoretic film 22. Operations S23 and S21 will be described in detail below.

First, the circuit film 4 is coupled to the substrate 21 in operation S23. Operation S23 may be performed by coupling the circuit film 4 onto the substrate 21 to be disposed at the outer side of the electrophoretic film 22. In operation S23, the circuit film 4 may be coupled to the substrate 21 with an anisotropic conductive film (not shown). The circuit film 4 may be in a state where the driving IC 10 and the flexible printed circuit 20 have been coupled to the circuit film 4. The circuit film 4 may be coupled to the substrate 21 such that a plurality of gate lines and data lines formed on the substrate 21 are electrically connected to the driving IC 10 in a Chip On Film (COF) type.

Subsequently, the protective sheet 3 is coupled to the electrophoretic film 22 in operation S21. Operation S21 may be performed by coupling the protective sheet 3 onto the electrophoretic film 22. By operation S21, the electrophoretic film 22 is disposed between the substrate 21 and the protective sheet 3.

Herein, as illustrated in FIG. 4, when manufacturing the EPD device 1 having the extended PS structure, in the method of manufacturing the EPD device, according to still other embodiment of the present invention, operation S23 of coupling the circuit film 4 to the substrate 21 may be performed prior to operation S21 of coupling the protective sheet 3 to the electrophoretic film 22. That is, operation S23 of coupling the circuit film 4 to the substrate 21 may be performed, and then operation S21 of coupling the protective sheet 3 to the electrophoretic film 22 may be performed. As illustrated in FIG. 2, when manufacturing the EPD device 1 having the normal structure, in the method of manufacturing the EPD device, according to still other embodiment of the present invention, operation S21 of coupling the protective sheet 3 to the electrophoretic film 22 may be performed prior to operation S23 of coupling the circuit film 4 to the substrate 21. That is, operation S21 of coupling the protective sheet 3 to the electrophoretic film 22 may be performed, and then operation S23 of coupling the circuit film 4 to the substrate 21 may be performed.

Subsequently, the first sealant 5 is formed in operation S3. Operation S3 may be performed by forming the first sealant 5 onto the substrate 21. Accordingly, the first sealant 5 may seal a gap between the electrophoretic film 22 and the protective sheet 3, and a gap between the electrophoretic film 22 and the substrate 21. Accordingly, the first sealant 5 can protect the electrophoretic film 22 from water. In operation S3, the first sealant 5 may be formed at the top surface 21a of the substrate 21. The first sealant 5 may be formed in a tetragonal ring shape to surround the entire outer side of the electrophoretic film 22.

As illustrated in FIG. 4, in manufacturing the EPD device 1 having the extended PS structure, operation S23 of forming the first sealant 5 may be performed by forming the first sealant 5 between the substrate 21 and the protective sheet 3. Operation S3 may be performed by discharging a fluid sealant to a gap between the protective sheet 3 and the circuit film 4. By operation S3, as illustrated in FIG. 3, the first sealant 5 may be formed to contact the side 22a of the electrophoretic film 22, a portion of the protective sheet 3 disposed at the outer side of the electrophoretic film 22, a portion of the top surface 21a of the substrate 21 disposed at the outer side of the electrophoretic film 22, and a portion of the one surface 4a of the circuit film 4.

As illustrated in FIG. 2, in manufacturing the EPD device 1 having the normal structure, operation S3 of forming the first sealant 5 may be performed by discharging a fluid sealant onto the substrate 21. By operation S3, as illustrated in FIG. 2, the first sealant 5 may be formed to contact the side 22a of the electrophoretic film 22, the side 3a of the protective sheet 3, a portion of the top surface 21a of the substrate 21 disposed at the outer side of the electrophoretic film 22, and a portion of the one surface 4a of the circuit film 4.

Subsequently, the second sealant 6 is formed in operation S4. Operation S4 may be performed by forming the second sealant 6 between the circuit film 4 and the protrusion member 211 that is formed to protrude outward from a portion of the substrate 21 coupled to the circuit film 4. Therefore, the second sealant 6 may seal a gap between the substrate 21 and the circuit film 4. Accordingly, the second sealant 6 can protect the electrophoretic film 22 from water. In the method of manufacturing the EPD device according to still other embodiment of the present invention, provided can be the EPD device 1 that can doubly prevent water from penetrating into the electrophoretic film 22 by using the first and second sealants 5 and 6. According to the method of manufacturing the EPD device, accordingly, the EPD device 1 can prevent performance from being deteriorated by water with which the electrophoretic film 22 is stained, and thus the EPD device 1 with enhanced reliability for quality can be manufactured.

Operation S4 may be performed by discharging a fluid sealant onto the protrusion member 211. As illustrated in FIG. 4, the second sealant 6 may be formed to contact the protrusion member 211 and a portion of the other surface 4b of the circuit film 4, by operation S4. The protrusion member 211 may be entirely formed in a tetragonal ring shape, and the second sealant 6 may be formed in a tetragonal ring shape to correspond to the protrusion member 211. The protrusion member 211 may support the second sealant 6 instead of the support member 7. Accordingly, the second sealant 6 may be supported by the protrusion member 211, and thus can be securely maintained in a state capable of sealing a gap between the substrate 21 and the circuit film 4.

As illustrated in FIG. 4, the groove 212 for disposing the second sealant 6 therein may be formed at the protrusion member 211. A portion of the substrate 21 with the protrusion member 211 formed therein may be formed thinner than another portion of the substrate 21, by the groove 212. Accordingly, a broad space for forming the second sealant 6 between the protrusion member 211 and the circuit film 4 may be secured. Accordingly, the method of manufacturing the EPD device according to still other embodiment of the present invention can enhance workability in operation S4 of forming the second sealant 6 between the protrusion member 211 and the circuit film 4. Although not shown, the method of manufacturing the EPD device according to still other embodiment of the present invention may include an operation of forming the protrusion member 211 on the substrate 21. The operation of forming the protrusion member 211 on the substrate 21 may be performed by etching a portion of the substrate 21, which is disposed at an outer side of a portion of the substrate 21 coupled to the circuit film 4, to form the groove 212. The operation of forming the protrusion member 211 on the substrate 21 may also be performed by mechanically processing a portion of the substrate 21, which is disposed at an outer side of a portion of the substrate 21 coupled to the circuit film 4, to form the groove 212.

Although not shown, in the method of manufacturing the EPD device according to still other embodiment of the present invention, operation S3 of forming the first sealant 5 and operation S4 of forming the second sealant 6 may be performed simultaneously, or one of operations S3 and S4 may be performed first.

Subsequently, the first and second sealants 5 and 6 are hardened in operation S5. Operation S5 may be performed by heat-hardening the first and second sealants 5 and 6. Although not shown, operation of hardening the first sealant 5 and operation of hardening the second sealant 6 may be performed simultaneously, or one of operations may be performed first.

According to the embodiments of the present invention, by preventing water from penetrating into the electrophoretic film, the EPD device can prevent performance from being deteriorated by water with which the electrophoretic film is stained, thus enhancing reliability for the performance of the EPD device.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An electrophoretic display (EPD) device comprising:
an electrophoretic display panel comprising a substrate with a thin film transistor formed thereon, and an electrophoretic film coupled to the substrate;
a protective sheet coupled to the electrophoretic film;
a circuit film coupled to the substrate to be disposed at an outer side of the electrophoretic film;
a first sealant formed on the substrate to surround the entire outer side of the electrophoretic film, for sealing a gap between the electrophoretic film and the protective sheet and a gap between the electrophoretic film and the substrate;
a support member coupled to the substrate to be disposed on the reverse of the electrophoretic film with respect to the substrate; and
a second sealant formed between the circuit film and the support member, for sealing a gap between the substrate and the circuit film,
wherein the first sealant is formed at the one surface of the circuit film,
wherein the second sealant is formed at another surface of the circuit film on the reverse of one surface of the circuit film and is in contact with the support member,
wherein the support member is coupled to the substrate to protrude outward from the substrate and support the second sealant at a portion of the support member protruding from the substrate.

2. The EDP device according to claim 1, wherein the support member is formed in a size larger than the substrate to protrude outward from the substrate.

3. The EDP device according to claim 1,
wherein the substrate comprises a protrusion member formed to protrude outward from a portion of the substrate coupled to the circuit film, and
wherein the second sealant is formed between the protrusion member and the circuit film.

4. The EDP device according to claim 3, further comprising a groove for disposing the second sealant therein is formed in the protrusion member.

5. The EDP device according to claim 1, wherein the second sealant is disposed at a side of the substrate.

6. The EDP device according to claim 1, wherein the first sealant is formed to be disposed between the protective sheet and the circuit film.

7. The EPD device according to claim 1, wherein the substrate includes a first surface and a second surface opposing the first surface, the electrophoretic film disposed on the first surface and the support member disposed on the second surface of the substrate.

8. The EPD device according to claim 7, wherein the first sealant is formed on the first surface of the substrate.

9. The EPD device according to claim 7, wherein the second surface of the substrate is in contact with a top surface of the support member.

10. The EPD device according to claim 9, wherein the second sealant is in contact with the top surface of the support member.

11. The EPD device according to claim 7, wherein the electrophoretic film has a first surface and a second surface opposing the first surface, the protective sheet being disposed on the first surface of the electrophoretic film, the second surface of the electrophoretic film being disposed on the first surface of the substrate.

12. The EPD device according to claim 7, wherein the circuit film is in contact with the first surface of the substrate.

13. The EPD device according to claim 12, wherein the circuit film is spaced apart from the electrophoretic film to define the gap between the circuit film and the electrophoretic film.

* * * * *